United States Patent
Salminen et al.

(10) Patent No.: US 12,122,086 B2
(45) Date of Patent: Oct. 22, 2024

(54) APPARATUS AND METHOD FOR SHRINKING SYNTHETIC FILTER FABRIC

(71) Applicant: Valmet Technologies, Inc., Espoo (FI)

(72) Inventors: Tapio Salminen, Espoo (FI); Antti Mäkinen, Espoo (FI)

(73) Assignee: Valmet Technologies, Inc., Espoo (FI)

(*) Notice: Subject to any disclaimer, the term of this patent is extended or adjusted under 35 U.S.C. 154(b) by 334 days.

(21) Appl. No.: 17/499,554

(22) Filed: Oct. 12, 2021

(65) Prior Publication Data
US 2022/0118677 A1    Apr. 21, 2022

(30) Foreign Application Priority Data

Oct. 15, 2020  (FI) ...................................... 20206016

(51) Int. Cl.
| | |
|---|---|
| B29C 61/02 | (2006.01) |
| B01D 29/01 | (2006.01) |
| B01D 33/067 | (2006.01) |
| B01D 39/08 | (2006.01) |
| B01D 46/00 | (2022.01) |
| B29L 31/14 | (2006.01) |

(52) U.S. Cl.
CPC ............ *B29C 61/02* (2013.01); *B01D 29/012* (2013.01); *B01D 33/067* (2013.01); *B01D 39/083* (2013.01); *B01D 46/0001* (2013.01); *B29L 2031/14* (2013.01)

(58) Field of Classification Search
CPC .... B29C 61/02; B01D 29/012; B01D 46/0001
See application file for complete search history.

(56) References Cited

U.S. PATENT DOCUMENTS

| | | | |
|---|---|---|---|
| 3,436,041 A | 4/1969 | Haller | |
| 5,647,982 A | 7/1997 | Haythornthwaite | |
| 5,910,267 A * | 6/1999 | Stricker | H05B 3/36 |
| | | | 392/435 |
| 2002/0050036 A1* | 5/2002 | Perala | B01D 33/073 |
| | | | 28/142 |

FOREIGN PATENT DOCUMENTS

| | | |
|---|---|---|
| CN | 205808079 U | 12/2016 |
| JP | 3187185 B2 * | 7/2001 |
| WO | 0064559 | 11/2000 |

OTHER PUBLICATIONS

Finnish Patent and Registration Office Search Report dated Apr. 20, 2021.

* cited by examiner

*Primary Examiner* — Daniel McNally
(74) *Attorney, Agent, or Firm* — Stiennon & Stiennon

(57) ABSTRACT

At least one infrared element arrangement having at least one infrared element (3) comprising a plurality of infrared radiators (4) is mounted on a frame moveable with respect to a synthetic filter fabric mounted to a filtering surface. The frame may have wheels or the like such that the infrared radiators may be moved along the length of the filtering surface to heat the synthetic filter fabric (6) to a temperature of 100 to 160° C. for shrinking the fabric (6) on the filtering surface (5).

5 Claims, 1 Drawing Sheet

APPARATUS AND METHOD FOR SHRINKING SYNTHETIC FILTER FABRIC

CROSS REFERENCES TO RELATED APPLICATIONS

This application claims priority on Finnish App. No. 20206016, filed Oct. 15, 2020, the disclosure of which is incorporated by reference herein.

STATEMENT AS TO REGARDS TO INVENTIONS MADE UNDER FEDERALLY SPONSORED RESEARCH AND DEVELOPMENT

Not applicable.

BACKGROUND OF THE INVENTION

The present invention relates to an apparatus and a method for shrinking a synthetic filter fabric on a filtering surface, especially on a drum filter or a disc filter.

Filters, such as drum filters and disc filters, are used for continuous filtration whereby solids are separated from liquids through a filter fabric placed on a filter surface. The pressure difference draws liquid and air through the filter fabric and solids are trapped on a surface of the filter fabric. The filter fabric is typically made of polymer yarns. Metal yarns are also used in some applications.

Generally, the filter fabric is installed on the filter surface, such as on the drum filter or the disc filter, by hot water and/or steam. When installing the filter fabric on the drum filter, the pre-seamed filter fabric is first placed around the filter. Then, the filter is placed in a sink containing hot water, which will be gradually heated up to temperature of 95 to 100° C. The filter is submerged partially under water. After that, the filter is gradually rotated. A new portion of the fabric is kept in water for a few minutes before the filter is rotated again to submerge a next portion of the fabric. In case of the disc filters, they are completely submerged and kept in hot water for 15 to 25 minutes to shrink to whole fabric at the same time. Hot steam up to 130 to 150° C. can be used to aid the shrinking of the filter fabrics.

However, the use of hot water and steam for shrinking can cause dangerous situations because they can cause serious injuries to employees. In addition, the method cannot be used when the mill is shut down and thus without hot water and steam. Then, the filter fabric can not be replaced if there is no time to do so shortly after the mill start-up. Moreover, there are not always steam lines available. Then, metal fabrics are used for filtering. However, installation of the metal fabric is very complex and slow process. Tightening of the metal fabric around the filter surface is challenging. The metal fabric has to be welded to attach it on the filter and the fabric surface has to be grinded after welding to provide sufficient performance. There is a risk that the metal fabric leaves loose which shortens its service life. In addition, adjusting a right shrinking temperature may be challenging because too hot water and/or steam can burn holes in the fabric and too cold water and/or steam can leave the fabric loose. Thus, there is a need for improving of installation of the filter fabric on the filtering surface.

SUMMARY OF THE INVENTION

The object of the present invention is to provide an apparatus and a method for installing of a filter fabric on a filtering surface, which apparatus and method are safe and fast to use and provide optimal shrinking of the filter fabric.

The invention is defined by the features of the independent claims. Some specific embodiments are defined in the dependent claims.

According to a first aspect of the present invention, there is provided an apparatus comprising at least one infrared element arrangement comprising at least one infrared element comprising a plurality of infrared radiators, wherein the apparatus is configured to heat a synthetic filter fabric to a temperature of 100 to 160° C. for shrinking the fabric on a filtering surface.

According to an embodiment, a wavelength of the infrared radiator is 780 nm to 1 mm, preferably 2 to 4 μm.

According to an embodiment, the plurality of infrared radiators is configured to be placed 10 to 500 mm, preferably 50 to 150 mm, more preferably 80 to 120, even more preferably 100 mm, from a surface of the fabric.

According to an embodiment, the apparatus has a power of 2 to 100 kW, preferably 3 to 20 kW, more preferably 4 to 10 kW.

According to an embodiment, the maximum length of the infrared element arrangement is 1.3 times of the length of the filtering surface.

According to an embodiment, the apparatus is configured to shrink the fabric at least 0.5%, preferably 2 to 10%, more preferably about 2.5%, from its initial size.

According to a second aspect of the present invention, there is provided a method comprising: placing a synthetic filter fabric around a filtering surface, heating the fabric to a temperature of 100 to 160° C. by the apparatus for shrinking the fabric on a filtering surface.

According to an embodiment, the method comprises rotating the filtering surface around its longitudinal axle or the apparatus around the filtering surface at an average rotating speed of 0.1 to 3 m/min, preferably 0.5 to 1.5 m/min, more preferably 1 m/min.

According to an embodiment, the method comprises moving the apparatus gradually along an axial direction of the filtering surface by a moving means.

According to a third aspect of the present invention, the apparatus or the method is used for shrinking the synthetic filter fabric on a drum filter or a disc filter.

DESCRIPTION OF THE PREFERRED EMBODIMENTS

In the present context, the term "infrared radiation" comprises infrared wavelengths between 780 nm and 1 mm.

In the present context, the term "synthetic fabric" comprises fabrics made from either inorganic products or a mixture of organic ones and chemicals, such as polypropylene (PP), polyester (PES), polyamide (PA), polyethylene (PE) and polyvinylidene fluoride (PVDF).

In the present context, the term "filtering surface" comprises surfaces which allow liquid and air flow through it, such as a metal sieve or filter, such as a drum filter or a disc filter. The aim of at least some of the present embodiments is to provide an apparatus and a method which enables safe and fast installation of a synthetic filter fabric on a filtering surface, also during mill shutdowns.

Figure 1:
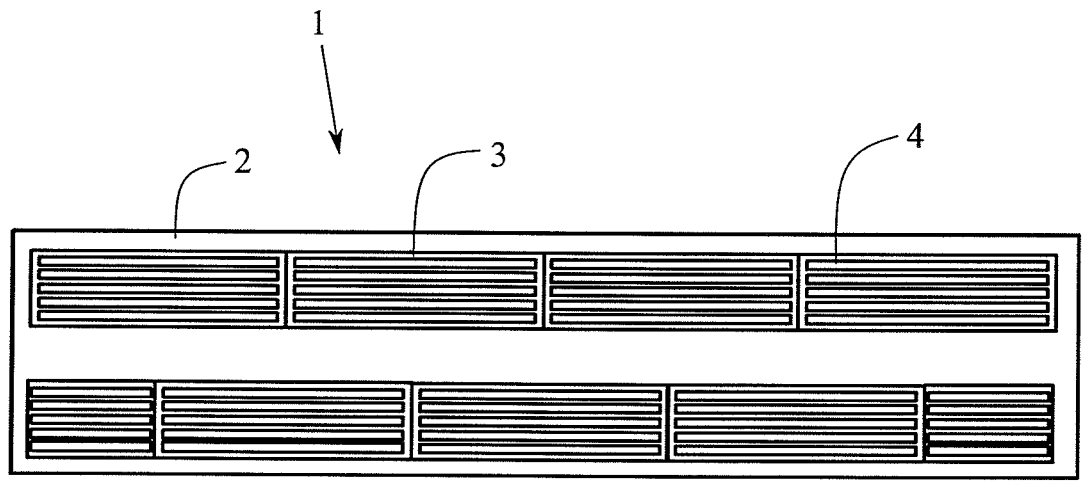
FIG. 1 illustrates an apparatus in accordance with at least some embodiments of the present invention.

FIG. 1 illustrates an apparatus 1 in accordance with at least some embodiments of the present invention. The apparatus 1 comprises at least one infrared (IR) element arrangement, which comprises at least one infrared (IR) element 3. The at least one infrared element comprises a plurality of infrared (IR) radiators 4. The apparatus is safe to use because it does not use hot water and/or steam for shrinking the fabric. In addition, shrinking of the fabric can be done during a shutdown of a mill when there is no hot water and/or steam available. Thus, there is plenty of time to change and shrink the fabric, because it does not have to be done shortly and rapidly after the mill start-up.

According to some embodiments, the apparatus 1 is configured to heat a synthetic filter fabric to a temperature of 100 to 160° C., preferably 120 to 130° C. for shrinking the fabric on a filtering surface. This enables shrinking of the fabric firmly around the filtering surface to keep the fabric in its place during use. The right heating temperature is more easily adjustable because the temperature is not dependent on the temperature of the hot water and/or steam of the lines of the mill.

The apparatus 1 can comprise means for measuring the temperature of the surface of the fabric 6. The means for measuring the temperature can comprise for example, an infrared thermometer or a thermographic camera.

The means for measuring the temperature can be rigidly fixed or connected to the apparatus. This enables easy and accurate measuring of the temperature because the measurement can be accurately focused on the area to be heated.

Alternatively, the means for measuring the temperature of the surface of the fabric 6 can be arranged to the filtering surface 5. Then, for example, the means for measuring the temperature in the filtering process can be also used for measuring temperature of the fabric during the heating of the fabric.

Alternatively, the temperature of the surface of the fabric can be measured by a separate device, such as by a hand held temperature measuring apparatus. This allows flexible temperature measurement because the measuring point can be easily changed, if necessary.

The IR element arrangement can comprise IR elements 3 arranged in different configurations. FIG. 1 illustrates that the IR elements can be arranged one after the other and/or side by side, for example.

The infrared arrangement can be attached to a body 2. The body 2 can be metal, such as aluminium. The body made of metal acts as a reflector to gather the heating flow towards the area to be heated.

The body 2 can be in the form of a box. The box can comprise a base and sidewalls, preferably four side walls. The IR elements 3 can be placed on the base inside the box. Then, the box gathers the heating flow towards the area to be heated and the side walls protect humans from heat nearby the apparatus.

The IR elements 3 can be installed at the same level on the body 2. This enables uniform heating of the fabric 6 because a distance from each element to the fabric is the same. Moreover, the apparatus is easy to manufacture because all the IR elements can be mounted to the same level on the body.

Alternatively, the IR elements 3 can be installed at different levels on the body 2. Then, the IR elements can be configured in the form of convex or concave, for example. This enables uniform heating of the fabric in the case of a convex or concave filtering surface because the elements can be adjusted to the same distance from the fabric.

Furthermore, the IR elements 3 can be arranged in different ways. For example, the IR elements can be arranged parallel to each other and parallel to the body 2, as illustrated in FIG. 1.

In addition, the IR radiators 4 can be arranged parallel in the IR element 3, as illustrated in FIG. 1.

According to some embodiments, the IR radiator 4 comprises a fused silica pulp.

The IR element 3 can have a power of 500 to 1500 W, preferably 650 to 1000 W. The IR elements having preferred power can be attached to the apparatus already at the manufacturing stage.

Alternatively, the power of the IR elements 3 can be configured to be adjustable. Then, the power can be adjusted taking into account the distance of the IR radiators 4 of the apparatus 1 from the surface of the fabric 6 to achieve efficient heating of the fabric.

Depending on the power of the IR element(s), the apparatus can comprise at least one, preferably 2 to 20, more preferably 3 to 10, IR elements for achieving preferred heating of the fabric.

Then, the apparatus 1 can have power of 2 to 100 kW, preferably 3 to 20 kW, more preferably 4 to 10 kW.

According to some embodiments, the wavelength of the IR radiator 4 is 780 nm to 1 mm. For example, near-infrared (NIR, IR-A) having wavelength of 780 nm to 1.4 μm, mid-wavelength infrared (MWIR, IR-B) having wavelength of 1.4 to 3 μm or far-infrared (FIR, IR-C) having wavelength of 3 μm to 1 mm can be used.

Preferably the wavelength of the IR radiator 4 is 2 to 4 μm, more preferably 2.4 to 3.3 μm, and even more preferably 3.2 μm.

Figure 2:
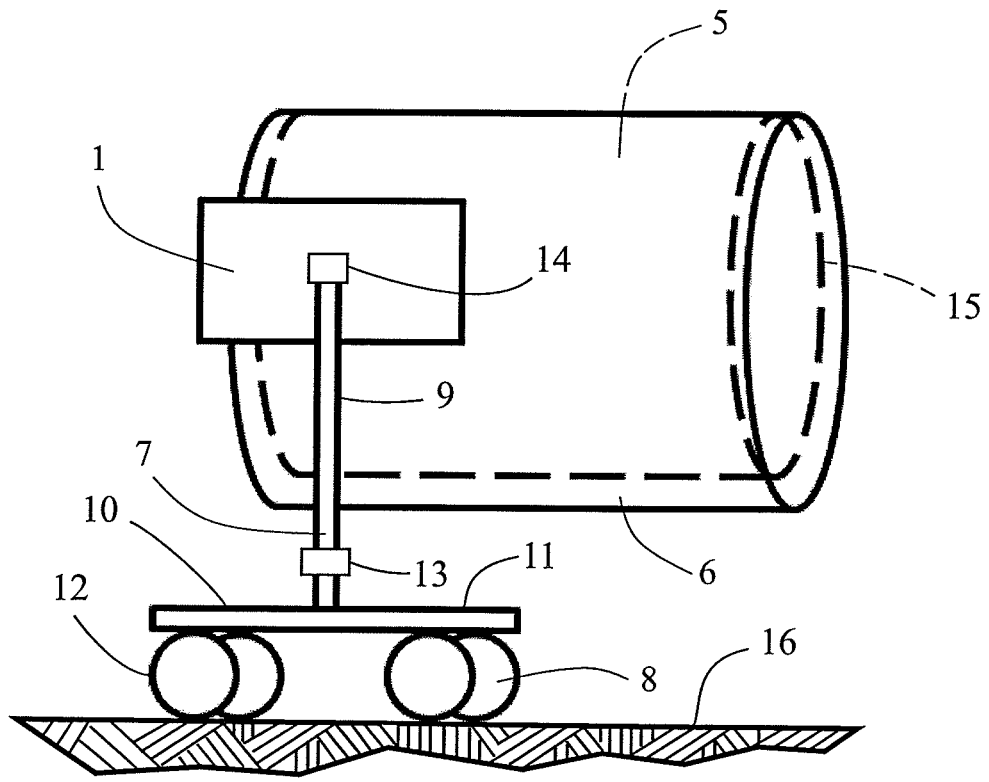
FIG. 2 illustrates an arrangement for shrinking a fabric on a filtering surface in accordance with at least some embodiments of the present invention.

FIG. 2 illustrates an arrangement for shrinking the fabric 6 on a filtering surface 5 of the filter frame 15 of a drum filter according to some embodiments. The fabric 6 is placed around the filtering surface 5. The apparatus 1 for heating the fabric is placed at the side of the filtering surface 5 at a heating distance from the fabric.

FIG. 2 illustrates that the apparatus 1 comprises frame elements 7 for supporting the apparatus 1 at a heating distance from the fabric 6 of the filtering surface 5. The frame elements 7 can comprise for example, at least one leg attached to the apparatus. The frame elements enable placing of the apparatus in the right place relating to the filtering surface 5 for efficient heating of the fabric. For example, the apparatus 1 can be placed on the floor of the mill by the frame elements. Alternatively, the apparatus 1 can be attached to the body of the filtering surface 5 by the frame elements 7.

Alternatively, the apparatus 1 can be placed at the heating distance from the fabric without the frame elements 7. The apparatus can be placed on a surface, such as on a separate table, at a preferred distance from the fabric 6. This alternative can be used especially in case of the smaller filtering surfaces 5, such as disc filters.

FIG. 2 illustrates that the apparatus 1 having a moving means for moving the apparatus to the heating distance from the fabric 6. The moving means can move the apparatus to the right distance from the fabric to provide efficient heating and move the apparatus along the length of the fabric for heating the entire length of the fabric.

The frame elements 7 may include a horizontally extending base member 11 with an upwardly extending vertical member, to which the apparatus is mounted. The moving means 8 can comprise for example, rolling wheels 12 attached to the leg(s) of the base member 11. Preferably all the legs are equipped with rolling wheels. The rolling wheels 12 enable moving of the apparatus along the floor 16 before and/or during the heating of the fabric and adjusting the IR elements to the right distance from the fabric.

Alternatively, the apparatus 1 can be attached to a crane for moving and lifting of the apparatus. Hence, there is no need for the frame elements 7 and the moving means 8, such as the rolling wheels 12. Then, the apparatus 1 can be attached directly from the body 2 of the apparatus to the crane by fastening means, such as a belt, a chain or a pulley.

According to some embodiments, the apparatus 1 comprises adjusting elements for setting the apparatus at the heating distance from the fabric 6. The adjusting elements may comprise for example, a lifting mechanism 13 for adjusting the height of the apparatus and/or a tilting mechanism 14 for adjusting the angle of the apparatus. The lifting and the tilting mechanism can be mechanical or electrical. The adjusting elements enable placing the apparatus at the right distance from the filtering surface for efficient heating of the fabric.

The apparatus 1 can be configured to be placed above, or preferably at the side, of the filtering surface. Placing of the apparatus at the side of the filtering surface enables the directing of IR radiation away from the users and thus provides safe use of the apparatus.

Alternatively, the apparatus 1 may be configured to heat the fabric 6 from at least two different sides of the filtering surface. For example, the IR elements 3 can be placed above and under the filtering surface and/or on both sides of the filtering surface 5. This enables faster and more uniform heating and shrinking of the fabric. The apparatus can be placed perpendicularly to the fabric of the filtering surface. This enables uniform heating and shrinkage of the fabric.

According to some embodiments, the plurality of infrared radiators 4 are configured to be placed 10 to 500 mm, preferably 50 to 150 mm, more preferably 80 to 120, even more preferably 100 mm, from a surface of the fabric 6. Setting the right distance from the surface of the fabric is important due to the efficient heating of the fabric because too great a distance can cause inadequate shrinking, while too short a distance can burn holes in the fabric.

According to some embodiments, the apparatus is configured to move gradually along an axial direction of the filtering surface by moving means 8. A gradual movement can be used for example, when the filtering surface 5 is longer than the apparatus 1. So, the apparatus can be moved gradually in the axial direction of the filtering surface for heating the entire length of the fabric for shrinking the fabric on the filtering surface.

According to some embodiments, the maximum length of the infrared element arrangement 1 is 1.3 times of the length of the filtering surface 5. The length of the arrangement can be adjusted already at the manufacturing stage of the apparatus 1. The arrangement can comprise IR elements 3 having the same or different lengths. A plurality of IR elements can be arranged one after the other to form the arrangement having a preferred length.

For example, the length of the infrared element arrangement can be at least the length of the filtering surface. Then, the whole fabric can be shrunk around the filtering surface without moving the apparatus 1. This also enables uniform heating and shrinkage of the fabric.

Alternatively, the length of the infrared element arrangement can be shorter than the length of the filtering surface. Then, the apparatus 1 can be moved by the moving means 8 for heating the entire length of the fabric 6. The shorter apparatus enables its use when room is limited.

The apparatus can be configured to heat the fabric when the filtering surface is installed in its application. Thus, there is no need for removing the filtering surface from a line of the mill and replacing it after installation of the fabric.

According to some embodiments, the apparatus 1 is configured to shrink the fabric 6 at least 0.5%, preferably 2 to 10%, more preferably about 2.5%, from an initial size of the fabric. The fabric can be shrunk in all dimensions of the fabric. The fabric can be shrunk in its axial direction and circumference. Loose fabric is easy to set around the filtering surface and sufficient shrinkage enables the fabric to attach tightly on the filtering surface. This enables a long service life and good filtering properties because the fabric stays firmly in its place.

According to some embodiments, the synthetic filter fabric is a woven fabric. The fabric can be for example, a mono filament fabric, a multifilament fabric or a double-layer fabric.

The fabric can be pre-seamed. Thus, the ends of the fabric can be attached together to form a cylinder-like piece of fabric before placing it around the filtering surface.

According to some embodiments, the synthetic filter fabric comprises polypropylene (PP), polyester (PES), polyamide (PA), polyethylene (PE) and polyvinylidene fluoride (PVDF).

According to some embodiments, a method for shrinking the fabric on the filtering surface comprises placing a synthetic filter fabric 6 around a filtering surface 5 and heating the synthetic filter fabric to a temperature of 100 to 160° C., preferably 120 to 130° C., by an apparatus 1. Due to the method, some of the work steps are omitted. For example, there is no need for welding and grinding of the fabric which has to be done when a metal fabric is used. Thus, the method is also faster and may require fewer employers to implement it.

According to some embodiments, the method comprises moving the apparatus 1 to the heating distance from the fabric 6 by moving means 8. The apparatus can be moved to the heating distance before heating is started. In addition, the apparatus can be moved during the heating process for heating the entire length of the fabric.

The method can comprise moving the apparatus 1 gradually along an axial direction of the filtering surface 5 by the moving means. Then, the apparatus can be moved during the heating process for heating the entire length of the fabric, for example, when the length of the fabric is longer than the length of the apparatus. Then, the apparatus can be placed first at the first end of the filtering surface to shrink the first portion of the fabric. Then, the apparatus can be moved further along the axial direction of the filtering surface to shrink the second portion of the fabric. This procedure is continued until the apparatus has reached the second end of the filtering surface and the last portion of the fabric is shrunk.

According to some embodiments, the method comprises setting the apparatus 1 at a heating distance from the fabric 6 by adjusting the adjusting elements 13, 14. The apparatus can be set at the heating distance before the heating of the fabric is started. For example, a height and an angle of the apparatus can be set. Preferably, the apparatus is set at the side of the filtering surface and perpendicularly to the fabric. In addition, the apparatus can be set at the heating distance during the heating process, for example, when the filtering surface and thus the fabric on it have an irregular shape.

Then, the height and/or angle of the apparatus can be changed to provide heating of all the fabric on the filtering surface.

According to some embodiments, the method comprises rotating the filtering surface around its longitudinal axis at an average rotating speed of 0.1 to 3 m/min, preferably 0.5 to 1.5 m/min, more preferably at a speed of 1 m/min. The filter surface can be rotated in its application. The filter surface can be rotated by rotating means, such as an electric motor, which is used to rotate the filter surface during its use.

Alternatively, the method comprises rotating the apparatus 1 around the filtering surface 5 at average rotating speed of 0.1 to 3 m/min, preferably 0.5 to 1.5 m/min, more preferably at speed of 1 m/min. Then, the filtering surface stays still and the apparatus is moved around the filtering surface for example, by moving the means 8. The apparatus can be rotated around the filtering surface at a horizontal direction or around the axis of the filtering surface.

The fabric can be longer in an axial direction than the filtering surface, such as a drum filter. Then, the fabric can be shrunk over both ends of the filtering surface for more firm attachment of the fabric on the filtering surface.

Finally, the fabric 6 can be attached to both ends of the filtering surface 5 by fastening means, such as by a flange. This secures the fabric in its place.

The filtering surface 5 can be a drum filter or a disc filter. However, the apparatus 1 and the method can also be used to shrink other fabrics and filter fabrics.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention can be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics can be combined in any suitable manner in one or more embodiments. In the description above, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

We claim:

1. A method for shrinking synthetic filter fabric comprising the steps of:

placing a synthetic filter fabric around a filtering surface of a filter frame which is a part of a drum filter or a disc filter, the synthetic filter fabric having an initial size and extending in an axial direction;

moving a heating apparatus with respect to the synthetic filter fabric to a heating distance, the heating apparatus having at least one infrared element arrangement which comprises at least one infrared element, each at least one infrared element comprising a plurality of infrared radiators, the heating apparatus having a frame with a plurality of wheels rotatably mounted thereto and traveling over a floor as the heating apparatus is moved in the axial direction so that the plurality of infrared radiators travel parallel to the filter fabric; and heating the synthetic filter fabric with the heating apparatus to a temperature of 100 to 160° C. to shrink the synthetic filter fabric on the filtering surface to shrink the fabric from its initial size.

2. The method of claim 1, further comprising a step of setting the heating apparatus at the heating distance from the synthetic filter fabric by adjusting a lifting mechanism and a tilting mechanism of the heating apparatus.

3. The method of claim 2 where the setting of the lifting mechanism or the tilting mechanism is carried out during the heating process.

4. The method of claim 1, wherein the filter frame has a longitudinal axis, and further comprising a step of rotating the filtering surface on the filter frame around the longitudinal axis, or moving the heating apparatus around the filtering surface at an average rotating speed of 0.1 to 3 m/min.

5. A method for shrinking synthetic filter fabric on the filter frame of a drum filter or a disc filter, comprising the steps of:

placing a synthetic filter fabric around a filtering surface of a filter frame of or the disc filter, the synthetic filter fabric having an initial size, the filtering surface extending in an axial direction;

moving a heating apparatus over a floor with respect to the synthetic filter fabric to a heating distance, the heating apparatus having a frame to which is mounted at least one infrared element arrangement which comprises at least one infrared element, each at least one infrared element comprising a plurality of infrared radiators, the frame having a plurality of wheels rotatably mounted thereto and traveling over the floor as the heating apparatus is moved in the axial direction so that the plurality of infrared radiators travel parallel to the filter fabric; and heating the synthetic filter fabric with the heating apparatus to a temperature of 100 to 160° C. to shrink the synthetic filter fabric on the filtering surface to shrink the fabric at least 0.5% from its initial size, wherein the step of heating the synthetic filter fabric with the heating apparatus is carried out while the heating apparatus is moving with respect to the synthetic filter fabric.

* * * * *

UNITED STATES PATENT AND TRADEMARK OFFICE
CERTIFICATE OF CORRECTION

PATENT NO. : 12,122,086 B2
APPLICATION NO. : 17/499554
DATED : October 22, 2024
INVENTOR(S) : Tapio Salminen and Antti Mäkinen It is certified that error appears in the above-identified patent and that said Letters Patent is hereby corrected as shown below:

In the Specification

Column 1, Line 28, "made of polymer yams" should be --made of polymer yarns--.

Column 1, Line 29, "yams are also used" should be --yarns are also used--.

In the Claims

Column 8, Line 60, "of a filter frame of or the disc filter" should be --of a filter frame of the drum filter or the disc filter--.

Signed and Sealed this
Nineteenth Day of August, 2025

Coke Morgan Stewart
*Acting Director of the United States Patent and Trademark Office*